(12) United States Patent
Nakai

(10) Patent No.: US 6,388,817 B2
(45) Date of Patent: May 14, 2002

(54) F-THETA LENS

(75) Inventor: Yoko Nakai, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/805,209

(22) Filed: Mar. 14, 2001

(30) Foreign Application Priority Data

Mar. 29, 2000 (JP) ........................................ 2000-090803

(51) Int. Cl.$^7$ ............................. G02B 3/00; G02B 9/14
(52) U.S. Cl. ........................................ 359/662; 359/787
(58) Field of Search ................... 359/662, 722, 359/787

(56) References Cited

U.S. PATENT DOCUMENTS 5,694,251 A * 12/1997 Shimada et al. ............ 359/662

OTHER PUBLICATIONS

Japanese Patent Office, Japanese Unexamined Patent Publication No. 7–191261, Date of Publication: Jul. 28, 1995, Application No.: 6–11573, Filing Date: Feb. 3, 1994, pp. 1–27 (English Language Abstract).

* cited by examiner

Primary Examiner—Ricky Mack
Assistant Examiner—Evelyn A. Lester
(74) Attorney, Agent, or Firm—Snider & Associates; Ronald R. Snider

(57) ABSTRACT

An fθ lens comprises, successively from the luminous flux entrance side, a first lens made of a negative lens having a flat surface on one side, a positive second lens having a surface with a stronger curvature directed onto the image side, and a third lens made of a negative meniscus lens cemented to the second lens; and satisfies the following conditional expressions (1) to (3):

$$-2.2 < f_1/f < -1.7 \qquad (1)$$

$$0.35 < f_2/f \qquad (2)$$

$$2.21 < N_3 + 0.0176\nu_3 < 2.27 \qquad (3)$$

where f is the composite focal length of the whole lens system, $f_1$ is the focal length of first lens, $f_2$ is the focal length of second lens, $N_3$ is the refractive index of third lens at d-line, and $\nu_3$ is the Abbe number of third lens at d-line.

4 Claims, 8 Drawing Sheets

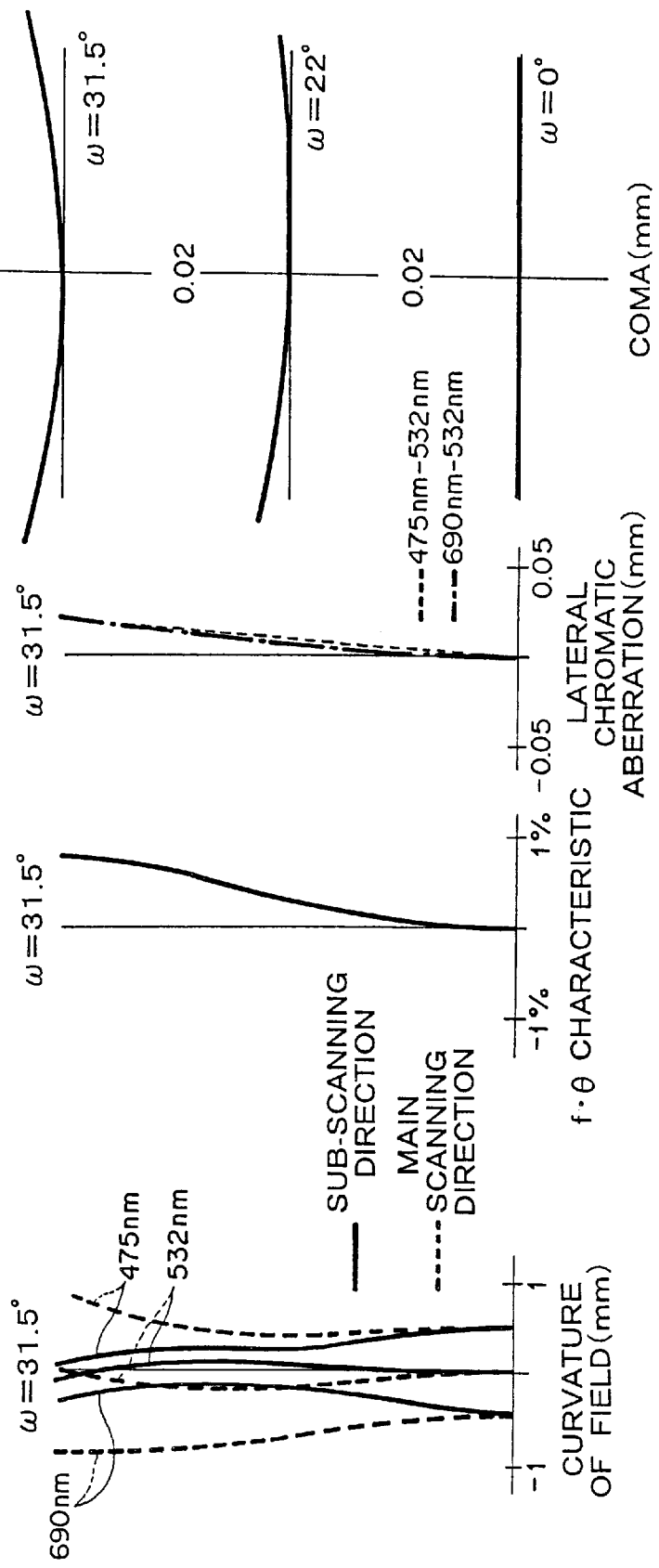

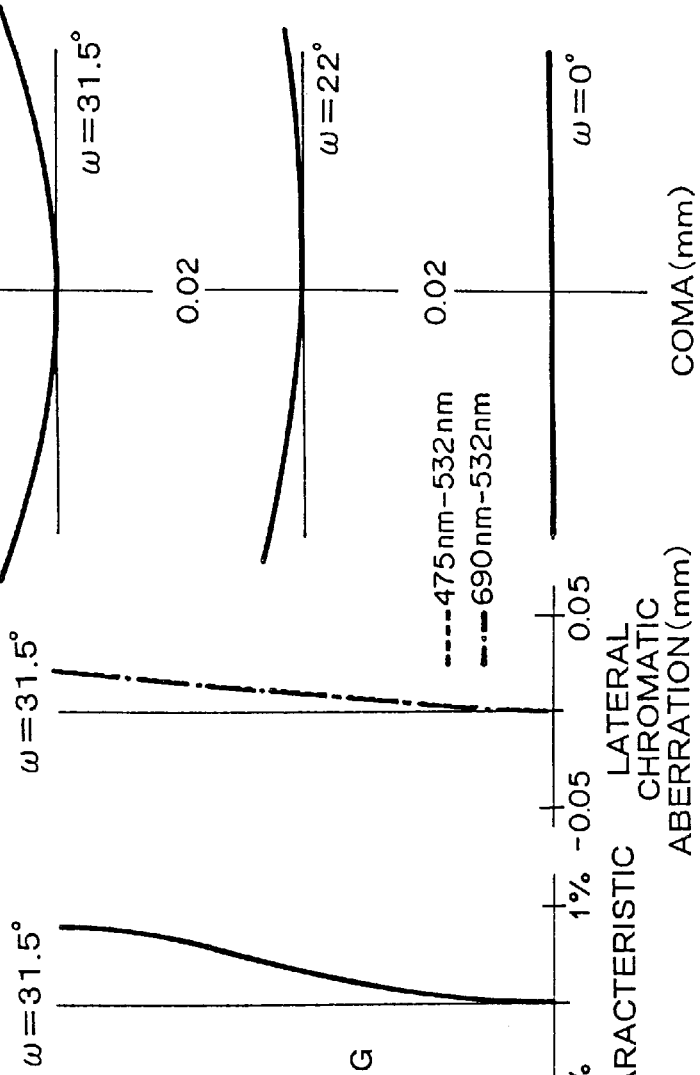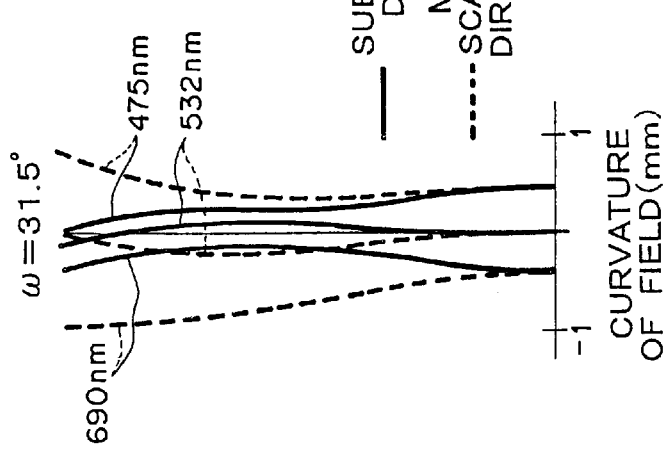

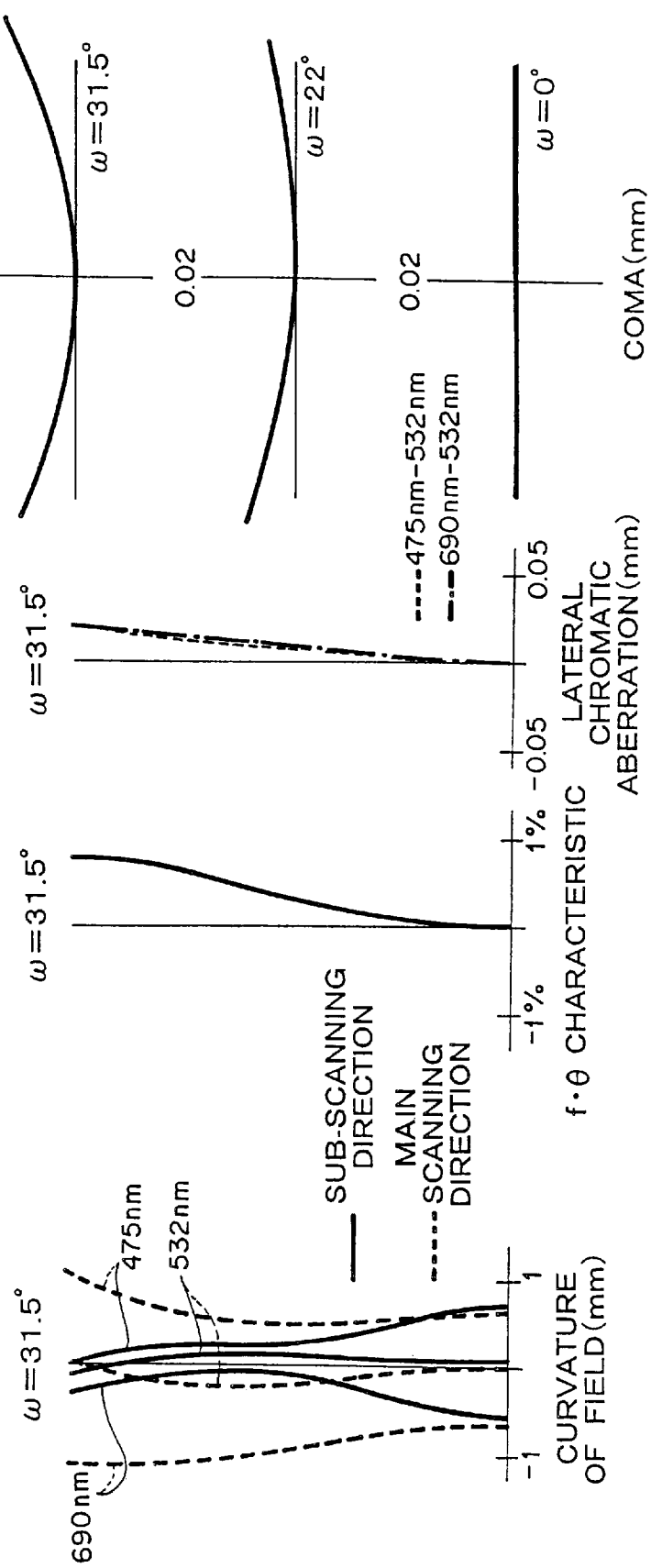

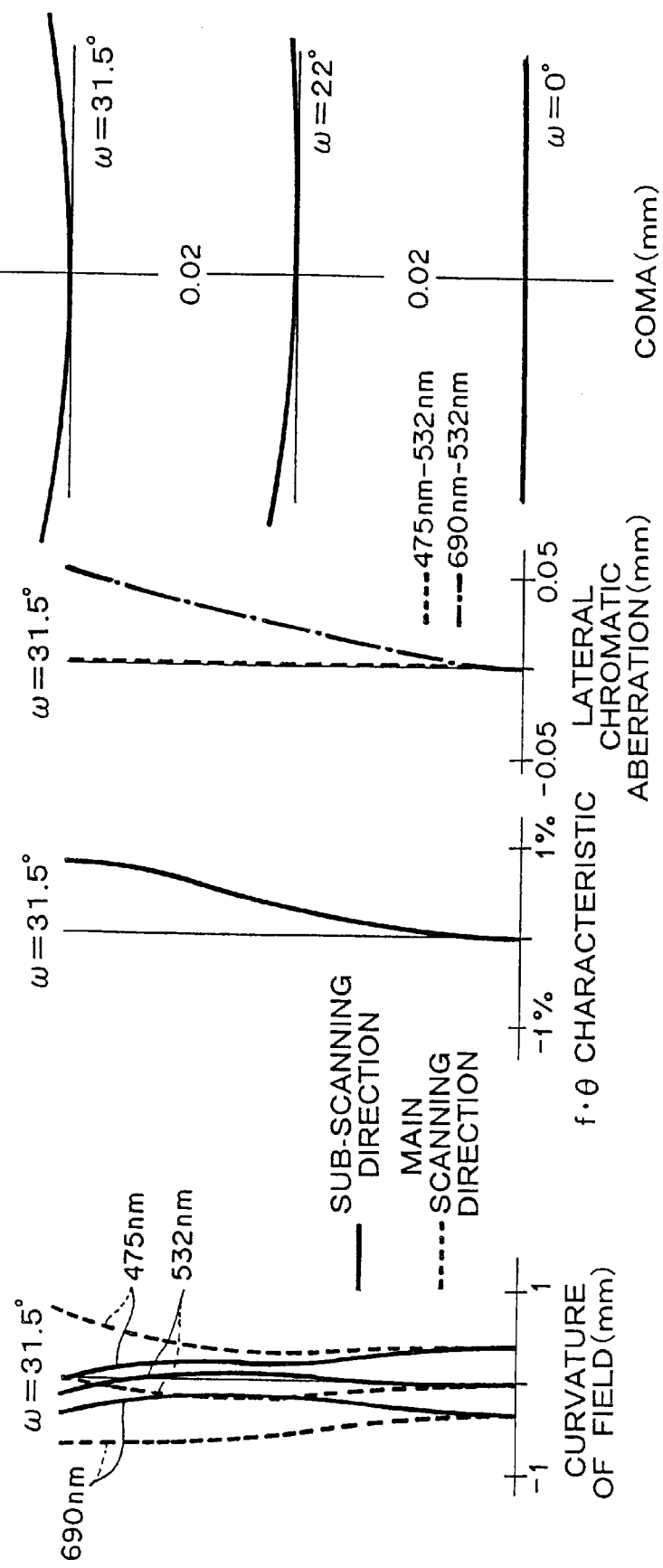

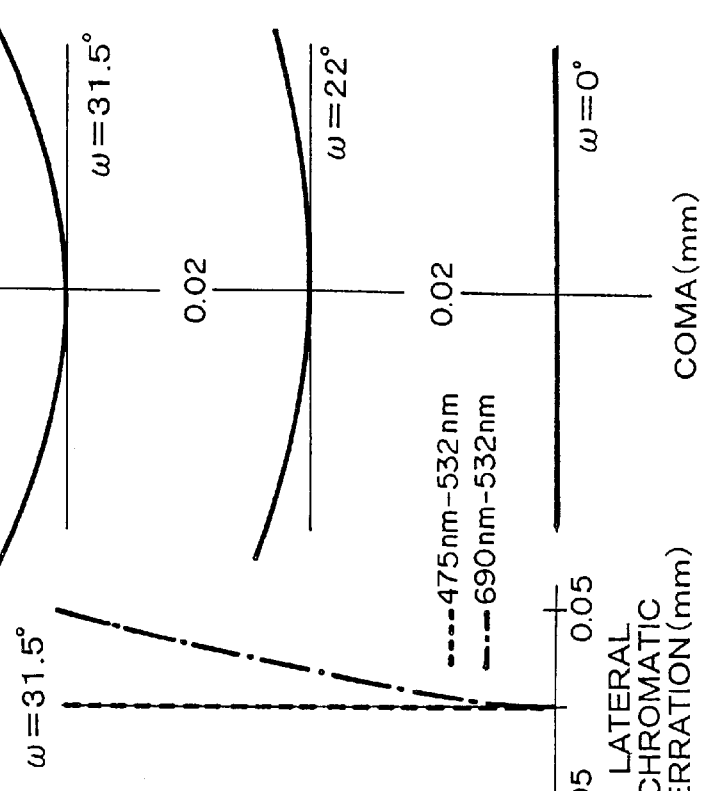
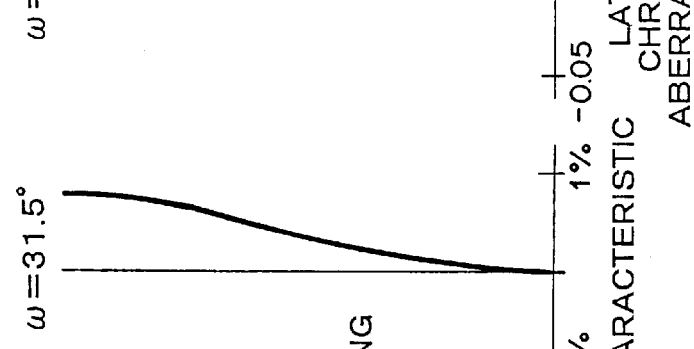
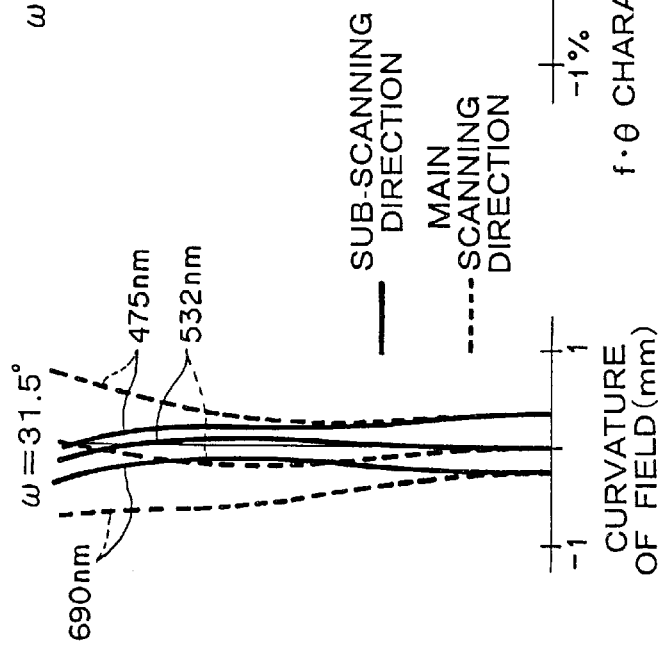

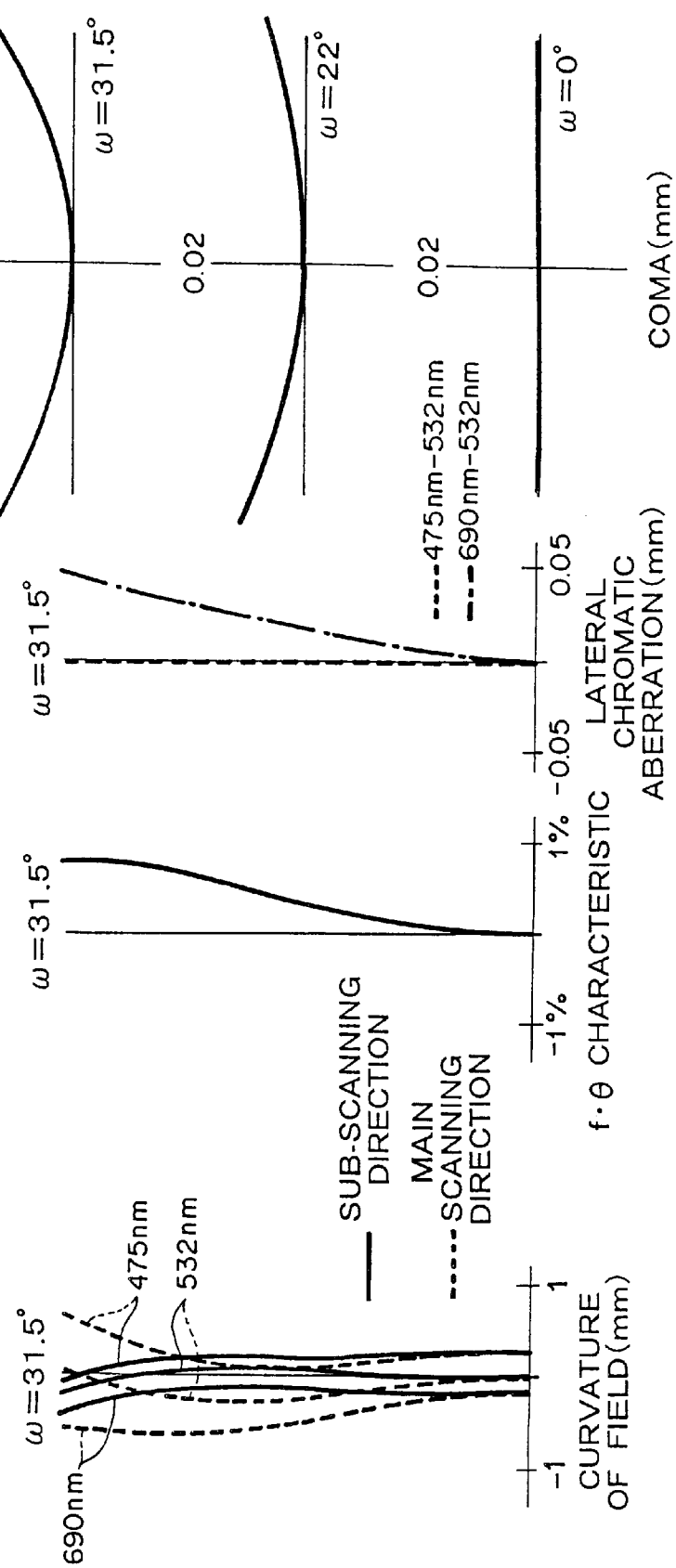

F-THETA LENS

RELATED APPLICATIONS

This application claims the priority of Japanese Patent Application No. 2000-090803 filed on Mar. 29, 2000, which is incorporated herein by reference.

BACKGROUND OF THE INVENTION

1. Field of the Invention

The present invention relates to an fθ lens used for scanning a light beam such as laser beam on an optical scanning surface at a constant speed in a laser printer or the like; and, in particular, to an fθ lens for a scanning optical system using three laser beams having wavelengths different from one another.

2. Description of the Prior Art

Conventionally known is an optical beam scanning apparatus which records a color image onto a silver halide film by using three laser beams having wavelengths different from one another, e.g., wavelengths corresponding to R, G, and B for the silver halide film.

In such an optical beam scanning apparatus, an fθ lens is disposed upstream its optical scanning surface such that the laser beams can be scanned on the film surface at a constant speed. In particular, those used for recording color images are required to correct chromatic aberrations concerning the three colors of laser beams.

Among the chromatic aberrations, axial chromatic aberration does not become a serious problem as long as it is not greater than a predetermined value, since it can be corrected upon adjusting at least one of pairs of collimating lenses $2a$, $2b$, $2c$ and cylindrical lenses $3a$, $3b$, $3c$ disposed between respective light sources $1a$, $1b$, $1c$ and a deflector $4$ in an optical beam scanning apparatus shown in FIGS. 9A and 9B, for example.

As for lateral chromatic aberration, on the other hand, there has been known not only a technique in which respective light emission timings for different colors of laser beams are shifted from each other so as to correct the aberration, but also a technique in which an fθ lens itself is used for correction.

Known as an example of technique in which an fθ lens itself is used as such is one disclosed in Japanese Unexamined Patent Publication No. 7-191261 using a two-group, three-element lens.

In the technique disclosed in the above-mentioned publication, however, though lateral chromatic aberration is favorably corrected, no particular attention is paid to other aberrations, whereby the latter are not always made favorable. For example, letting the wavelength in use λ be 680 nm, the spot diameter will be about 120 μm if the F-number of fθ lens is 50. In this case, coma is 40 μm, thus reaching ⅓ of this spot diameter.

When correcting lateral chromatic aberration by employing the above-mentioned technique of shifting light emission timings of different colors of laser beams, the scanning position of a laser beam can substantially align with a given scanning position of a reference laser beam upon changing the light emission period. However, it requires complicated control and may be problematic in terms of cost.

Therefore, it is desirable that lateral chromatic aberration be initially made favorable to a practically permissible level by use of an fθ lens, and then the above-mentioned electric correction technique be used when a finer image is required.

SUMMARY OF THE INVENTION

In view of such circumstances, it is an object of the present invention to provide a compact fθ lens which can make lateral chromatic aberration favorable and suppress various aberrations such as coma to a low level.

The present invention provides an fθ lens comprising, successively from a luminous flux entrance side, a first lens made of a negative lens having a flat surface on one side, a second lens made of a positive lens having a surface with a stronger curvature directed onto an image side, and a third lens made of a negative meniscus lens, the second and third lenses being cemented together;

the fθ lens satisfying the following conditional expressions (1) to (3):

$$-2.2 < f_1/f < -1.7 \tag{1}$$

$$0.35 < f_2/f \tag{2}$$

$$2.21 < N_3 + 0.0176 v_3 < 2.27 \tag{3}$$

where f is the composite focal length of the whole lens system;

$f_1$ is the focal length of first lens;

$f_2$ is the focal length of second lens;

$N_3$ is the refractive index of third lens at d-line; and $v_3$ is the Abbe number of third lens at d-line.

Preferably, the first lens is a cylindrical lens.

Preferably, the cylindrical lens is configured such as to have a power only in a main scanning direction.

Preferably, the first lens is configured such that the flat surface is directed onto the luminous flux entrance side.

Due to the configuration mentioned above, lateral chromatic aberration and coma can be ameliorated by the lens having a relatively simple configuration.

Operations and effects obtained when the above-mentioned conditional expressions (1) to (3) are satisfied will now be explained.

The above-mentioned conditional expression (1) defines the focal length $f_1$ of first lens. Coma becomes greater if $f_1/f$ exceeds the upper limit of conditional expression (1), whereas the fθ lens becomes greater if $f_1/f$ is less than the lower limit.

The above-mentioned conditional expression (2) defines the focal length $f_2$ of second lens. Coma becomes greater if $f_2/f$ is less than the lower limit of conditional expression (2).

The above-mentioned conditional expression (3) defines the refractive index $N_3$ and Abbe number $v_3$ of third lens at d-line. Lateral chromatic aberration becomes greater if the upper limit of conditional expression (3) is exceeded, whereas curvature of field becomes greater if the lower limit is not satisfied.

Since the fθ lens of the present invention satisfies each of the above-mentioned conditional expressions (1), (2), and (3), lateral chromatic aberration, coma, and curvature of field become favorable at the same time, and the lens system can be made smaller.

Since one surface of the first lens is made flat, the fθ lens can be made at a lower cost.

The first lens may be made as a cylindrical lens and may have a power only in a main scanning direction, whereby the fθ lens can be made at a further lower cost.

In this case, if the surface of first lens on the luminous flux entrance side is made flat, it will be preferable in that it can restrain the light reflected by the surface of first lens on the luminous flux entrance side from returning to a polygon mirror and being reflected again so as to pass through the fθ lens and form a ghost image on the image surface.

BRIEF DESCRIPTION OF THE DRAWINGS

FIGS. 3A to 3D are aberration charts (showing curvature of field, fθ characteristic, lateral chromatic aberration, and coma) of the lens in accordance with Example 1;

FIGS. 4A to 4D are aberration charts (showing curvature of field, fθ characteristic, lateral chromatic aberration, and coma) of the lens in accordance with Example 2;

FIGS. 5A to 5D are aberration charts (showing curvature of field, fθ characteristic, lateral chromatic aberration, and coma) of the lens in accordance with Example 3;

FIGS. 6A to 6D are aberration charts (showing curvature of field, fθ characteristic, lateral chromatic aberration, and coma) of the lens in accordance with Example 4;

FIGS. 7A to 7D are aberration charts (showing curvature of field, fθ characteristic, lateral chromatic aberration, and coma) of the lens in accordance with Example 5;

FIGS. 8A to 8D are aberration charts (showing curvature of field, fθ characteristic, lateral chromatic aberration, and coma) of the lens in accordance with Example 6.

DESCRIPTION OF THE PREFERRED EMBODIMENTS

In the following, an embodiment of the present invention will be explained with reference to the drawings.

Figure 1A:
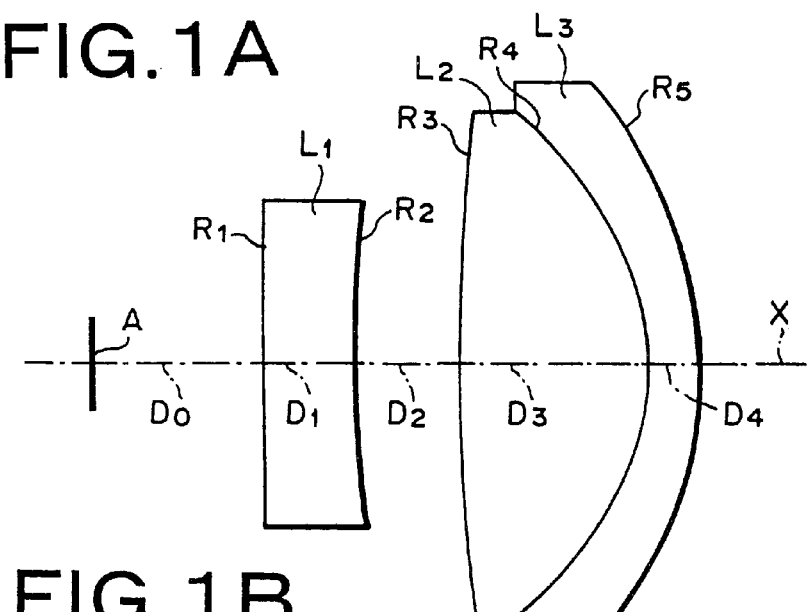
FIGS. 1A and 1B are schematic views showing a basic lens configuration in accordance with an embodiment of the present invention.
Figure 1B:
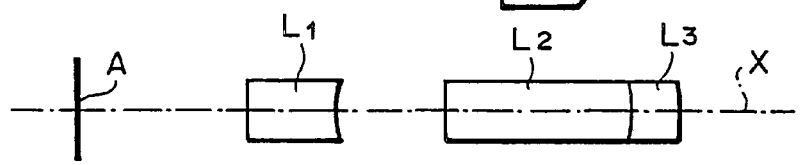
Figure 9A:
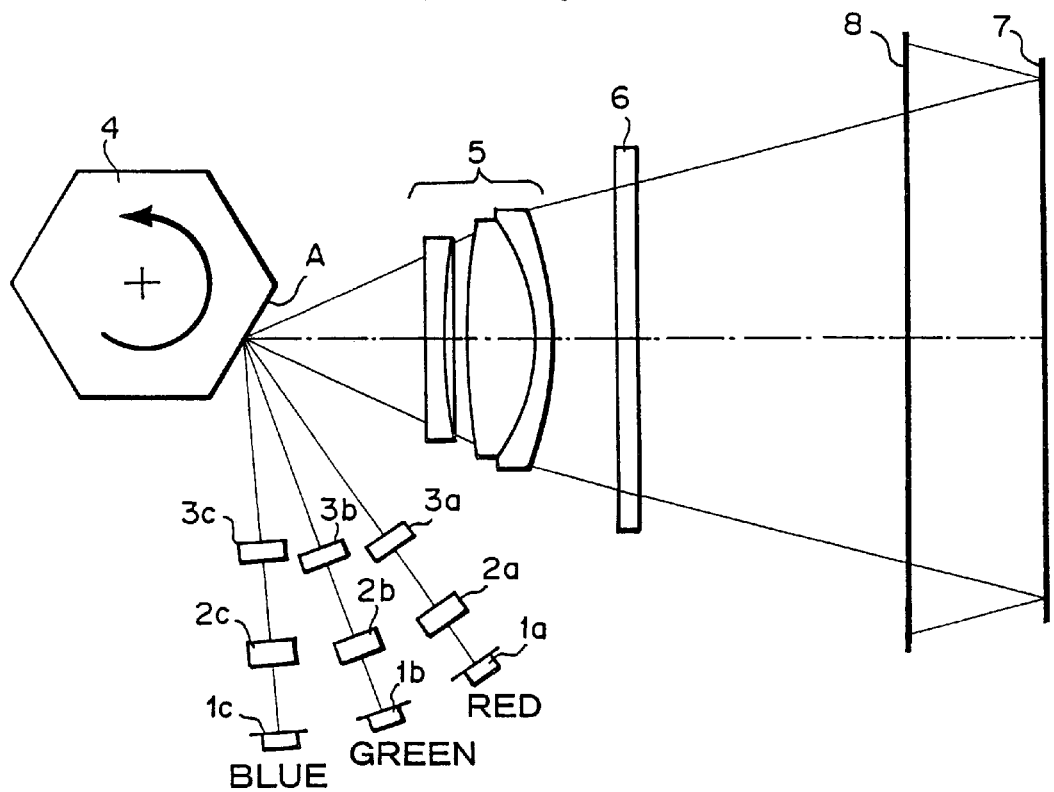
FIGS. 9A and 9B are schematic views showing an optical scanning apparatus to which the fθ lens in accordance with the above-mentioned embodiment is mounted.
Figure 9B:
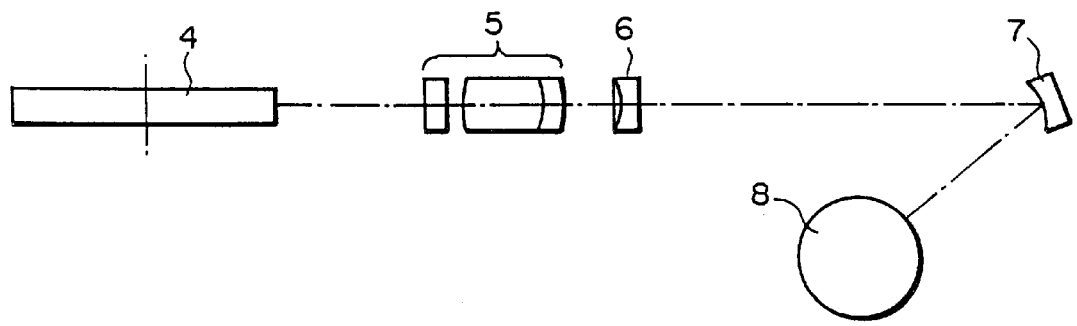

FIGS. 1A and 1B show a basic configuration of lenses in accordance with Examples 1 to 6. As shown in FIGS. 1A and 1B, the fθ lens in accordance with each of these examples is constituted by three lenses $L_1$ to $L_3$. For example, a luminous flux incident on the lens $L_1$ along an optical axis X from a reflecting surface A of a rotary polygon mirror 4 shown in FIGS. 9A and 9B is emitted from the lens $L_3$ and forms an image on an optical scanning surface 8 by way of an elongated cylindrical lens 6 and an elongated cylindrical mirror 7, whereas thus formed image is scanned on the optical scanning surface 8 as the rotary polygonal mirror 4 rotates.

FIG. 1A shows a cross section in the main scanning direction, whereas FIG. 1B shows a cross section in the sub-scanning direction.

Examples 1 to 6 will now be explained in detail.

EXAMPLE 1

The first lens $L_1$ is a plane-concave lens having a flat surface on one side; the second lens $L_2$ is a biconvex lens having a surface with a stronger curvature directed onto the image side; and the third lens $L_3$ is a negative meniscus lens, cemented to the second lens $L_2$, having a convex surface directed onto the image surface side.

These lenses satisfy the following conditional expressions:

$$-2.2 < f_1/f < -1.7 \quad (1)$$

$$0.35 < f_2/f \quad (2)$$

$$2.21 < N_3 + 0.0176v_3 < 2.27 \quad (3)$$

where f is the composite focal length of the whole lens system;
$f_1$ is the focal length of first lens;
$f_2$ is the focal length of second lens;
$N_3$ is the refractive index of third lens at d-line; and
$v_3$ is the Abbe number of third lens at d-line.

The following Table 1 shows the radius of curvature R (mm) of each lens surface, the center thickness and air space D (mm) of each lens, and refractive index N and Abbe number v of each lens at d-line in Example 1.

In Table 1 and Tables 2 to 6 which will be explained later, numerals referring to each of the letters R, D, N, and v successively increase from the luminous flux entrance side.

Here, the distance $d_0$ from the reflecting mirror surface A to the surface of first lens $L_1$ on the luminous flux entrance side is 10.149.

FIGS. 3A to 3D are graphs showing the curvature of field, fθ characteristic, lateral chromatic aberration, and coma of this fθ lens when laser beams having respective wavelengths of 475 nm, 532 nm, and 690 nm are made incident thereon. The curvature of field in the sub-scanning direction (direction perpendicular to the optical axis in FIG. 9B) is the one yielded when the cylindrical lens 6 (or the cylindrical mirror 7) having a power in the sub-scanning direction is disposed between the fθ lens and the image surface so as to construct a wobbling correction system.

As can be seen from FIGS. 3A to 3D, each of the aberrations including lateral chromatic aberration of the lens system can be made favorable in this example.

Figure 2A:
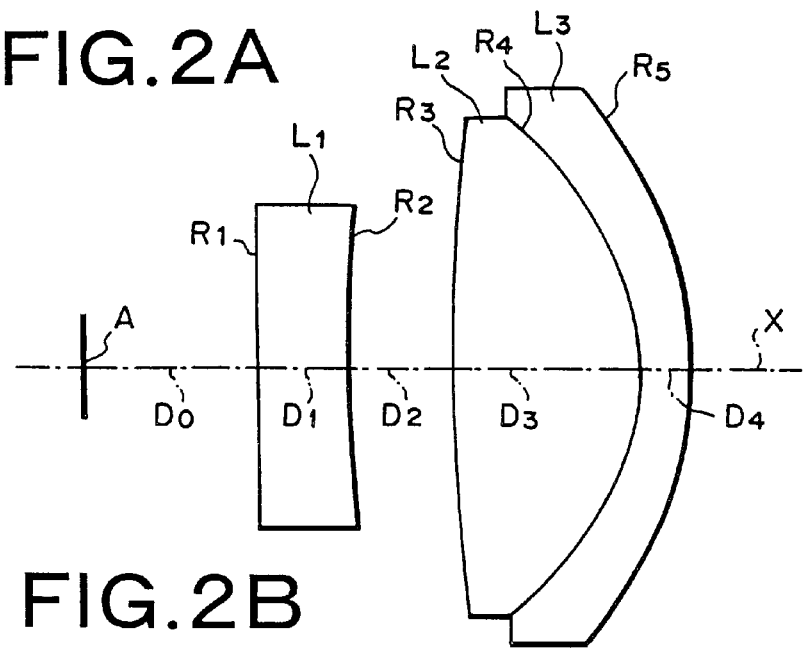
FIGS. 2A and 2B are schematic views showing a basic lens configuration in accordance with a modified example of the embodiment shown in FIGS. 1A and 1B.
Figure 2B:
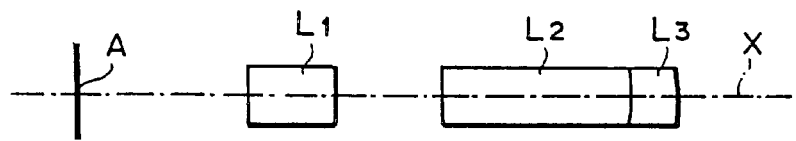

As shown in FIGS. 2A and 2B, the first lens may be made as a cylindrical lens having a power in the main scanning direction alone. In this case, a mass-production technique of cutting individual product lenses from an elongated rod-like lens body at predetermined intervals can be employed, whereby the fθ lens can be made at a lower cost. The same applies to the following examples as well. Here, FIG. 2A shows a cross section in the main scanning direction, whereas FIG. 2B shows a cross section in the sub-scanning direction.

EXAMPLE 2

The lens system of Example 2 has a configuration substantially the same as that of the lens system of Example 1.

The following Table 2 shows the radius of curvature R (mm) of each lens surface, the center thickness and air space D (mm) of each lens, and refractive index N and Abbe number v of each lens at d-line in Example 2.

Here, the distance $d_0$ from the reflecting mirror surface A to the surface of first lens $L_1$ on the luminous flux entrance side is 10.149.

FIGS. 4A to 4D are graphs showing the curvature of field, fθ characteristic, lateral chromatic aberration, and coma of this fθ lens when laser beams having respective wavelengths of 475 nm, 532 nm, and 690 nm are made incident thereon. The curvature of field in the sub-scanning direction is the one yielded when the cylindrical lens 6 (or the cylindrical mirror 7) having a power in the sub-scanning direction is disposed between the fθ lens and the image surface so as to construct a wobbling correction system.

As can be seen from FIGS. 4A to 4D, each of the aberrations including lateral chromatic aberration of the lens system can be made favorable in this example.

EXAMPLE 3

The lens system of Example 3 has a configuration substantially the same as that of the lens system of Example 1.

The following Table 3 shows the radius of curvature R (mm) of each lens surface, the center thickness and air space D (mm) of each lens, and refractive index N and Abbe number ν of each lens at d-line in Example 3.

Here, the distance $d_0$ from the reflecting mirror surface A to the surface of first lens $L_1$ on the luminous flux entrance side is 10.149.

FIGS. 5A to 5D are graphs showing the curvature of field, fθ characteristic, lateral chromatic aberration, and coma of this fθ lens when laser beams having respective wavelengths of 475 nm, 532 nm, and 690 nm are made incident thereon. The curvature of field in the sub-scanning direction is the one yielded when the cylindrical lens 6 (or the cylindrical mirror 7) having a power in the sub-scanning direction is disposed between the fθ lens and the image surface so as to construct a wobbling correction system.

As can be seen from FIGS. 5A to 5D, each of the aberrations including lateral chromatic aberration of the lens system can be made favorable in this example.

EXAMPLE 4

The lens system of Example 4 has a configuration substantially the same as that of the lens system of Example 1.

The following Table 4 shows the radius of curvature R (mm) of each lens surface, the center thickness and air space D (mm) of each lens, and refractive index N and Abbe number ν of each lens at d-line in Example 4.

Here, the distance $d_0$ from the reflecting mirror surface A to the surface of first lens $L_1$ on the luminous flux entrance side is 10.149.

FIGS. 6A to 6D are graphs showing the curvature of field, fθ characteristic, lateral chromatic aberration, and coma of this fθ lens when laser beams having respective wavelengths of 475 nm, 532 nm, and 690 nm are made incident thereon. The curvature of field in the sub-scanning direction is the one yielded when the cylindrical lens 6 (or the cylindrical mirror 7) having a power in the sub-scanning direction is disposed between the fθ lens and the image surface so as to construct a wobbling correction system.

As can be seen from FIGS. 6A to 6D, each of the aberrations including lateral chromatic aberration of the lens system can be made favorable in this example.

EXAMPLE 5

The lens system of Example 5 has a configuration substantially the same as that of the lens system of Example 1.

The following Table 5 shows the radius of curvature R (mm) of each lens surface, the center thickness and air space D (mm) of each lens, and refractive index N and Abbe number ν of each lens at d-line in Example 5.

Here, the distance $d_0$ from the reflecting mirror surface A to the surface of first lens $L_1$ on the luminous flux entrance side is 10.149.

FIGS. 7A to 7D are graphs showing the curvature of field, fθ characteristic, lateral chromatic aberration, and coma of this fθ lens when laser beams having respective wavelengths of 475 nm, 532 nm, and 690 nm are made incident thereon. The curvature of field in the sub-scanning direction is the one yielded when the cylindrical lens 6 (or the cylindrical mirror 7) having a power in the sub-scanning direction is disposed between the fθ lens and the image surface so as to construct a wobbling correction system.

As can be seen from FIGS. 7A to 7D, each of the aberrations including lateral chromatic aberration of the lens system can be made favorable in this example.

EXAMPLE 6

The lens system of Example 6 has a configuration substantially the same as that of the lens system of Example 1.

The following Table 6 shows the radius of curvature R (mm) of each lens surface, the center thickness and air space D (mm) of each lens, and refractive index N and Abbe number ν of each lens at d-line in Example 6.

Here, the distance $d_0$ from the reflecting mirror surface A to the surface of first lens $L_1$ on the luminous flux entrance side is 10.149.

FIGS. 8A to 8D are graphs showing the curvature of field, fθ characteristic, lateral chromatic aberration, and coma of this fθ lens when laser beams having respective wavelengths of 475 nm, 532 nm, and 690 nm are made incident thereon. The curvature of field in the sub-scanning direction is the one yielded when the cylindrical lens 6 (or the cylindrical mirror 7) having a power in the sub-scanning direction is disposed between the fθ lens and the image surface so as to construct a wobbling correction system.

As can be seen from FIGS. 8A to 8D, each of the aberrations including lateral chromatic aberration of the lens system can be made favorable in this example.

The following Table 7 shows values ($f_1/f$, $f_2/f$, and $N_3+0.0176\nu_3$) corresponding to the conditional expressions in the above-mentioned examples.

As can be seen from the aberration chart for chromatic aberration in each of the above-mentioned examples, aberration curves of B and R lines with respect to G line coincide with each other. Therefore, when an electric correction is to be carried out for lateral chromatic aberration thereafter, its processing can be made easier.

Without being restricted to those of the above-mentioned examples, the fθ lens of the present invention can be modified in various manners. For example, the radius of curvature R and lens space (or lens thickness) D of each lens can be changed as appropriate.

As explained in the foregoing, the fθ lens of the present invention satisfies predetermined conditional expressions, thereby being able to favorably correct various aberrations such as lateral chromatic aberration over a wide wavelength range. Therefore, even in a laser scanning apparatus for recording a color image by using three laser beams having wavelengths different from one another, the image formed thereby can attain a higher image quality. Also, since this fθ lens is constituted by a relatively simple lens system, it can be made at a lower cost. When the first lens is constituted by a cylindrical lens, the cost can further be lowered.

TABLE 1

| wavelength in use | $\lambda_1$ = 475 nm | $\lambda_2$ = 532 nm | $\lambda_3$ = 690 nm | |
|---|---|---|---|---|
| Surface | R | D | N | ν |
| 1 | ∞ | 5.434 | 1.65844 | 50.8 |
| 2 | 137.900 | 6.248 | | |
| 3 | 190.641 | 11.017 | 1.51680 | 64.2 |

TABLE 1-continued

| wavelength in use | $\lambda_1$ = 475 nm | $\lambda_2$ = 532 nm | $\lambda_3$ = 690 nm | |
|---|---|---|---|---|
| Surface | R | D | N | ν |
| 4 | −24.816 | 2.966 | 1.80518 | 25.5 |
| 5 | −35.639 | | | | focal length f = 100 mm
FNO. = 51
half angle of view ω = 31.5°

TABLE 2

| wavelength in use | $\lambda_1$ = 475 nm | $\lambda_2$ = 532 nm | $\lambda_3$ = 690 nm | |
|---|---|---|---|---|
| Surface | R | D | N | ν |
| 1 | ∞ | 6.356 | 1.65844 | 50.8 |
| 2 | 134.534 | 5.449 | | |
| 3 | 163.902 | 11.017 | 1.51680 | 64.2 |
| 4 | −23.685 | 2.966 | 1.72825 | 28.3 |
| 5 | −36.800 | | | | focal length f = 100 mm
FNO. = 51
half angle of view ω = 31.5°

TABLE 3

| wavelength in use | $\lambda_1$ = 475 nm | $\lambda_2$ = 532 nm | $\lambda_3$ = 690 nm | |
|---|---|---|---|---|
| Surface | R | D | N | ν |
| 1 | ∞ | 2.598 | 1.66680 | 33.0 |
| 2 | 122.030 | 5.500 | | |
| 3 | 150.488 | 11.017 | 1.51680 | 64.2 |
| 4 | −21.909 | 2.966 | 1.66680 | 33.0 |
| 5 | −37.054 | | | | focal length f = 100 mm
FNO. = 51
half angle of view ω = 31.5°

TABLE 4

| wavelength in use | $\lambda_1$ = 475 nm | $\lambda_2$ = 532 nm | $\lambda_3$ = 690 nm | |
|---|---|---|---|---|
| Surface | R | D | N | ν |
| 1 | ∞ | 3.644 | 1.65844 | 50.8 |
| 2 | 137.944 | 7.082 | | |
| 3 | 219.531 | 11.017 | 1.51680 | 64.2 |
| 4 | −25.454 | 2.966 | 1.80518 | 25.5 |
| 5 | −35.687 | | | | focal length f = 100 mm
FNO. = 51
half angle of view ω = 31.5°

TABLE 5

| wavelength in use | $\lambda_1$ = 475 nm | $\lambda_2$ = 532 nm | $\lambda_3$ = 690 nm | |
|---|---|---|---|---|
| Surface | R | D | N | ν |
| 1 | ∞ | 3.876 | 1.65844 | 50.8 |
| 2 | 116.927 | 5.007 | | |
| 3 | 138.533 | 11.017 | 1.51680 | 64.2 |
| 4 | −21.726 | 2.966 | 1.66680 | 33.0 |
| 5 | −37.153 | | | | focal length f = 100 mm
FNO. = 51
half angle of view ω = 31.5°

TABLE 6

| wavelength in use | $\lambda_1$ = 475 nm | $\lambda_2$ = 532 nm | $\lambda_3$ = 690 nm | |
|---|---|---|---|---|
| Surface | R | D | N | ν |
| 1 | ∞ | 4.539 | 1.51680 | 64.2 |
| 2 | 88.486 | 4.137 | | |
| 3 | 112.413 | 11.017 | 1.51680 | 64.2 |
| 4 | −21.597 | 2.966 | 1.66680 | 33.0 |
| 5 | −38.176 | | | | focal length f = 100 mm
FNO. = 51
half angle of view ω = 31.5°

TABLE 7

| | $f_1/f$ | $f_2/f$ | $N_3 + 0.0176\, \nu_3$ |
|---|---|---|---|
| Example 1 | −2.07 | 0.43 | 2.254 |
| Example 2 | −2.03 | 0.41 | 2.226 |
| Example 3 | −1.81 | 0.38 | 2.248 |
| Example 4 | −2.08 | 0.45 | 2.254 |
| Example 5 | −1.76 | 0.37 | 2.248 |
| Example 6 | −1.70 | 0.36 | 2.248 |

What is claimed is:

1. An fθ lens comprising, successively from a luminous flux entrance side, a first lens made of a negative lens having a flat surface on one side, a second lens made of a positive lens having a surface with a stronger curvature directed onto an image side, and a third lens made of a negative meniscus lens, said second and third lenses being cemented together;

said fθ lens satisfying the following conditional expressions (1) to (3):

$$-2.2 < f_1/f < -1.7 \quad (1)$$

$$0.35 < f_2/f \quad (2)$$

$$2.21 < N_3 + 0.0176 \nu_3 < 2.27 \quad (3)$$

where f is the composite focal length of the whole lens system;

$f_1$ is the focal length of first lens;

$f_2$ is the focal length of second lens;

$N_3$ is the refractive index of third lens at d-line; and $\nu_3$ is the Abbe number of third lens at d-line.

2. An fθ lens according to claim 1, wherein said first lens is a cylindrical lens.

3. An fθ lens according to claim 2, wherein said cylindrical lens is configured such as to have a power only in a main scanning direction.

4. An fθ lens according to claim 1, wherein said first lens is configured such that said flat surface is directed onto the luminous flux entrance side.

* * * * *